US006217085B1

(12) United States Patent
Toulouse

(10) Patent No.: US 6,217,085 B1
(45) **Date of Patent: *Apr. 17, 2001**

(54) CONNECTION FOR A COMPRESSED GAS ATTACHMENT DEVICE AND COMPRESSED GAS CARTRIDGE

(75) Inventor: Bruno Toulouse, Valence (FR)

(73) Assignee: Societe de Prospection et d'Inventions Techniques Spit, Bourg les Valence (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/198,496

(22) Filed: Nov. 24, 1998

(30) Foreign Application Priority Data

Nov. 28, 1997 (FR) ..................................................... 97 15004

(51) Int. Cl.[7] ..................................................... F16L 39/00

(52) U.S. Cl. ........................ 285/319; 285/140.1; 285/210

(58) Field of Search .................................... 285/209, 210, 285/319, 140.1

(56) References Cited

U.S. PATENT DOCUMENTS

| | | | | |
|---|---|---|---|---|
| 3,514,129 | * | 5/1970 | Holdren | 285/210 |
| 4,482,172 | * | 11/1984 | DeVera et al. | 285/140.1 |
| 5,070,858 | | 12/1991 | Wang . | |
| 5,263,439 | | 11/1993 | Doherty et al. . | |
| 5,328,216 | * | 7/1994 | Miyauchi et al. | 285/319 |
| 5,692,783 | * | 12/1997 | Watanabe et al. | 285/319 |
| 6,098,652 | * | 8/2000 | Brandt | 285/319 |

FOREIGN PATENT DOCUMENTS 48 714 7/1965 (FR) .

* cited by examiner

*Primary Examiner*—Lynne H. Browne
*Assistant Examiner*—Aaron Dunwoody
(74) *Attorney, Agent, or Firm*—Lowe Hauptman Gilman & Berner

(57) ABSTRACT

Connection for, on the one hand, a male ejection joining piece (23) of a fuel cartridge (20) intended to supply compressed gas to a compressed gas attachment device and, on the other hand, a male inlet joining piece (32) of a device (30) for inletting compressed gas into the device, comprising sealing means (11) intended to ensure the sealing tightness of the connection between the two joining pieces (23, 32) and a female seal support (1) arranged to receive the two male joining pieces (23, 32). The sealing means (11) are arranged to extend right across the seal plane of the two male joining pieces (23, 32).

The invention applies well to stopper attachment devices with a compressed gas-propelled plunger.

11 Claims, 3 Drawing Sheets

CONNECTION FOR A COMPRESSED GAS ATTACHMENT DEVICE AND COMPRESSED GAS CARTRIDGE

BACKGROUND OF THE INVENTION

A stopper attachment device with a compressed gas-propelled plunger is supplied with compressed gas, generally formed by a mixture of butane and propane, from a fuel cartridge containing, in an internal casing, gas compressed to the liquid state, referred to as "fuel" by persons skilled in the art. In addition to the fuel, the cartridge contains, between the internal casing and an external casing, a propellant formed from a mixture of nitrogen, butane and propane in the gaseous state and also intended to keep the fuel in the liquid state. A male ejection joining piece is connected to the internal casing and protrudes out of the external casing.

Upon each firing of the stopper a predetermined dose of compressed gas is injected from the fuel cartridge into a combustion chamber of the attachment device, the dose being controlled only if the compressed gas is metered in the liquid state.

In order to meter the compressed gas injected into the combustion chamber, certain attachment devices such as that disclosed in EP-0775 553A1 comprise a solenoid valve including a female joining piece for inletting compressed gas, with an integrated seal arranged in order to receive the male ejection joining piece of the fuel cartridge, the seal being intended to ensure sealing tightness of the connection between the two joining pieces. For each injection of fuel the solenoid valve is opened for a specific duration to meter fuel through, the inlet joining piece of the solenoid valve having a specific cross-section. In order to prevent possible fuel leaks, it would be appropriate to regularly change the seal which provides the sealing tightness of the solenoid valve-cartridge connection. However, changing a seal of this type has proven to be a complicated operation which, in practice, is never carried out.

It is an object of the invention to facilitate the operation of changing the seal for sealing the connection between the fuel cartridge and the solenoid valve for inletting compressed gas into the device.

SUMMARY OF THE INVENTION

The invention relates to a connection, on the one hand, for a male ejection joining piece of a fuel cartridge intended to supply compressed gas to a compressed gas attachment device and, on the other hand, for an inlet joining piece of a device for inletting compressed gas into the device, comprising a sealing arrangement to ensure sealing tightness of the connection between the two joining pieces. In accordance with the invention the joining piece of the compressed gas inlet device is a male joining piece, and the connection comprises a female seal support arranged to receive the two male joining pieces and the sealing arrangement are arranged to extend right across the seal plane of the two male joining pieces.

The invention is thus directed to relocating the seal which is no longer integrated into the inlet joining piece as in the prior art but is supported by a seal support which can be easily changed each time the fuel cartridge is changed.

The sealing arrangement can comprise a seal in the form of a sleeve arranged to surround the two male joining pieces.

In this case the seal can comprise an internal groove for retaining leaked gas. Thus, in the case of a leak, only a small volume of gas is lost The sealing arrangement can also comprise two O-rings respectively intended to surround the two male joining pieces.

The seal support is advantageously arranged to guide the two male joining pieces in such a way as to cause them to abut against each other.

For this reason it will suffice to introduce the two joining pieces to be connected into the seal support in-order to connect them.

It is also advantageous that the seal support comprises means for attachment to the fuel cartridge.

The fuel cartridge comprising a border, the attachment means can comprise at least two hooked legs arranged to be clipped on the border of the cartridge.

The invention also relates to an assembly comprising a fuel cartridge and connection means as defined above, wherein the connection means are firmly fixed to the fuel cartridge.

BRIEF DESCRIPTION OF THE DRAWINGS

The invention will be better understood with the aid of the following description of different embodiments of the connection of the invention, with reference to the attached drawing in which.

DETAILED DESCRIPTION OF THE INVENTION

A stopper attachment device with a compressed gas-propelled plunger comprises a combustion chamber intended to be supplied with compressed gas from a fuel cartridge 20.

In the particular example of the description the connection is intended to connect a solenoid valve 30, for inletting compressed gas into the combustion chamber of the attachment device, and the compressed gas cartridge 20.

Figure 4:
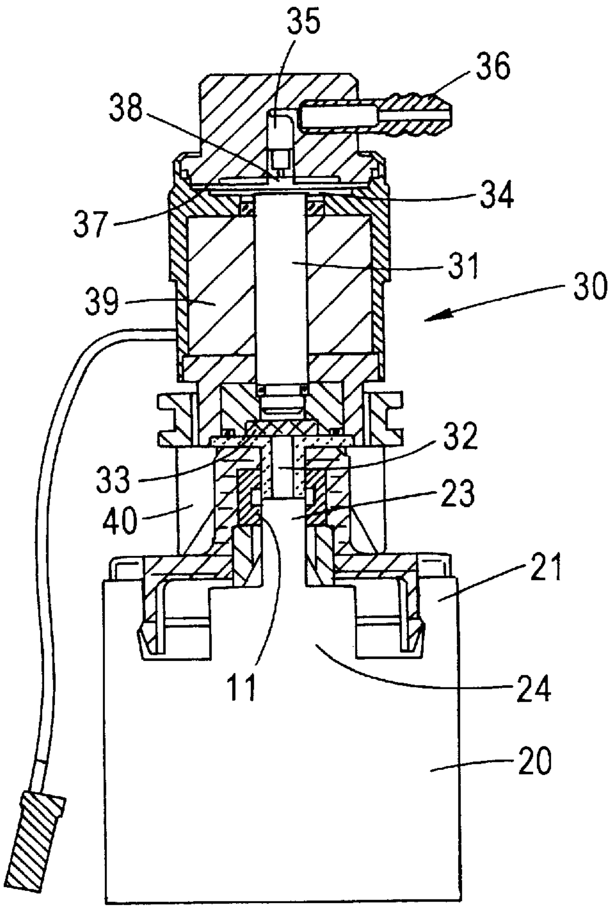
FIG. 4 is a cross-sectional view of the connection of FIG. 1 used to connect two joining pieces and FIG. 5 is a cross-sectional view of a second embodiment of the connection used to connect two joining pieces and FIG. 6 is a cross-sectional view of a third embodiment of the connection.

Referring to FIG. 4, the cartridge 20, which is generally cylindrical in shape, comprises, inside an internal casing, gas compressed to the liquid state, referred to as "fuel" by the person skilled in the art, and, between the internal casing and an external casing, a propellant. A circular border 21 extends as an extension of the external cylindrical wall of the cartridge 20 at one end thereof. A male ejection joining piece 23, connected to the internal casing, protrudes out of the cartridge by means of a projection 24 located at the centre of the circle described by the border 21.

The solenoid valve 30, which is generally cylindrical in shape, comprises an inlet duct 31 communicating by one of its ends with an inlet joining piece 32, a filter 33 being interposed, and by its other end with a metering chamber 34. The solenoid valve 30 also comprises an outlet duct 35 connected by one of its ends to an outlet joining piece 36 and by its other end to the metering chamber 34. The inlet duct 31 and outlet duct 35 communicate with the metering chamber 34 respectively by two orifices disposed opposite each other.

A spring washer 37 firmly fixed to a closure seal 39 is mounted inside the metering chamber 34 by its outer peripheral edge being introduced into a slit provided in the inner wall of the chamber 34.

The solenoid valve 30 also comprises an electromagnet 38 under the action of which the closure seal 38 can move from an inlet position to an outlet position by slight deformation of the spring washer 37. In the inlet position the closure seal 38 closes the orifice of the outlet duct 35 while the orifice of the inlet duct 31 is released and, in the outlet position, the closure seal 38 closes the orifice of the inlet duct 31 while the orifice of the outlet duct 35 is released.

The inlet joining piece 32 of the solenoid valve is a male joining piece surrounded by a bushing provided in this case with four lateral slits intended to receive a vent shaft 3 of the connection as will be explained hereinunder.

Figure 1:
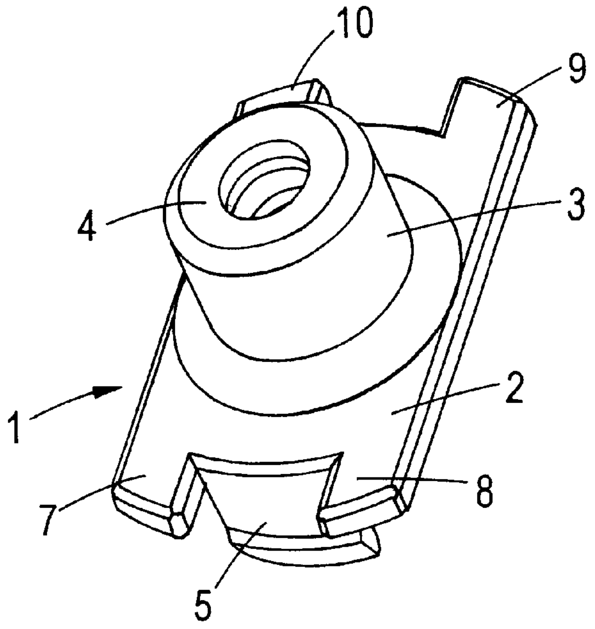
FIG. 1 is a perspective view of a first embodiment of the connection.
Figure 2:
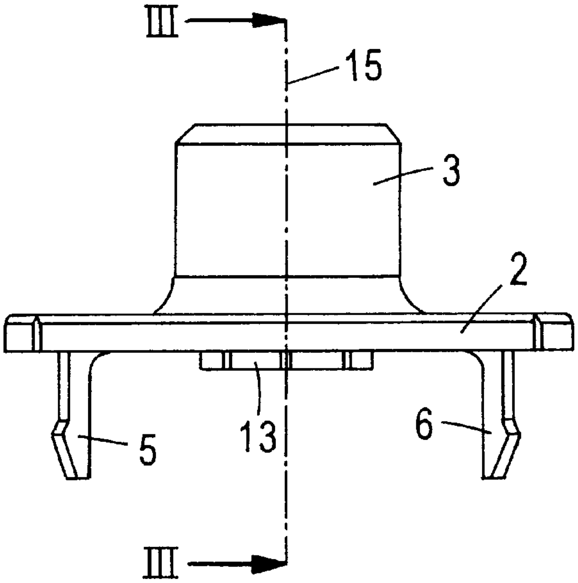
FIG. 2 is illustrates a side view of the connection of FIG. 1.
Figure 3:
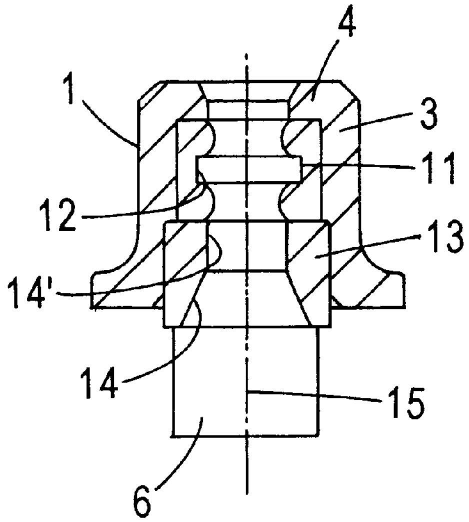
FIG. 3 is illustrates a cross-sectional view of the connection of FIG. 1 taken along the line III—III.

Referring additionally to FIG. 1, the connection comprises a female seal support 1 intended to receive the male ejection joining piece 23 of the fuel cartridge 20 and the male inlet joining piece 32 of the solenoid valve 30.

The seal support 1, which is a single piece of plastics material, comprises a planar abutment base 2, in this case substantially rectangular, supporting the vent shaft 3 which houses a seal 11 and is open at its two ends and extends along an axis 15 perpendicular to the abutment base 2, at one side thereof. The edge 4 of the free end of the vent shaft 3 turns back at a right angle towards the inside of the vent shaft 3 and forms an orifice for passage of the inlet joining piece 32 of the solenoid vale 30, having a cross-section substantially equal to that of the joining piece 32.

Two attachment legs 5, 6, which are connected to the abutment base 2 by one of their ends and are symmetrical to each other with respect to an axis 15, extend in two mutually parallel planes perpendicular to the abutment base 2 on the side opposite that of the vent shaft 3. The spacing between the two legs 5, 6 is substantially equal to the inner diameter of the border 21 of the fuel cartridge 20. Moreover, the two legs 5, 6 are each provided, at their free end, with a hook intended to hook onto the inner wall of the border 21.

The abutment base 2 comprises two pairs of abutment fingers 7–10 extending in the plane of the base 2. The two fingers 7–8 (9–10) of each pair are located on either side of the end where one of the attachment leas 5, (6) is connected to the base 2 and beyond the plane in which the leg 5 (6) extends with respect to the axis 15.

The seal 11 housed in the vent shaft 3 is in this case in the form of a sleeve and presents an inner groove 12 for retaining leaked gas. The seal 11 is held between the edge of the turned-back free end 4 of the vent shaft 3 and a retention ring 13 introduced into the vent shaft 3 by its orifice through the abutment base 2. The retention ring 13 comprises an inner wall 14 having a truncated portion widening towards the outside of the vent shaft and intended to facilitate guidance of the ejection joining piece 23 of the fuel cartridge 20 when it is introduced into the vent shaft 3, and another portion 14', adjacent to the seal 11, which is cylindrical in shape with a cross-section substantially equal to that of the ejection joining piece 23 and intended to guide and retain the joining piece 23.

The connection of the inlet joining piece 32 of the solenoid valve 30 and the ejection joining piece 23 of the fuel cartridge 20 will now be described.

In order to mount the connection on the fuel cartridge 20 the attachment legs 5, 6 are inserted into the border 21 of the cartridge 20 until the abutment fingers 7–10 abut against the border 21. The hooks of the legs 5, 6 hook and clip onto the inner wall of the border 21. In this position, the ring 13 projects slightly out of the vent shaft 3 and is in abutment against arrangement projection 24, ensuring the retention of the seal 11 in position inside the vent shaft 3.

During attachment of the connection to the cartridge 20, the ejection joining piece 23 of the cartridge 20 is guided into the vent shaft 3 by the inner walls 14, 14' of the retention ring 13.

The vent shaft 3 of the connection is then introduced into the bushing 40 of the solenoid valve 30 until the edge of the free end of the bushing 40 abuts against the abutment base 2 of the connection. During introduction of the vent shaft 3 of the connection into the bushing 40 the male inlet joining piece 32 of the solenoid valve 30 is guided into the vent shaft 3 by the edge of the turned-back end 4.

The two male joining pieces 23, 32 guided into the vent shaft 3, abut against each other and the seal 11 surrounds the two joining pieces 23, 32, extending right across the seal plane of the two joining pieces 23, 32.

When inoperative, the closure seal 38 of the solenoid valve 30 is in the inlet position. In this position compressed gas escapes from the fuel cartridge 20 by way of the ejection joining piece 23, passes into the solenoid valve 30 by way of the inlet joining piece 32 and fills the metering chamber 34 after passing through the filter 33 and into the inlet duct 31.

The seal 11 ensures the sealing tightness of the connection of the two joining pieces 23, 32. In the case of a possible leak of gas this gas will remain in the inner groove 12 of the seal which, in any case, is of a limited volume.

In order to supply the combustion chamber of the attachment device with compressed gas the outlet joining piece 36 is connected to the combustion chamber. The electromagnet 39 is actuated and under its action the spring washer 37 is slightly deformed and moves the closure seal 38 from its inlet position to its outlet position. The gas contained in the metering chamber 34 thus escapes towards the outlet joining piece 36 by way of the outlet duct 35. The electromagnet 39 is then shut off and the closure seal returns to the inlet position.

In order to inject the desired quantity of compressed gas into the combustion chamber of the attachment device, the closure seal 38 is thus caused to perform a reciprocating movement between its inlet position and its outlet position.

Figure 5:
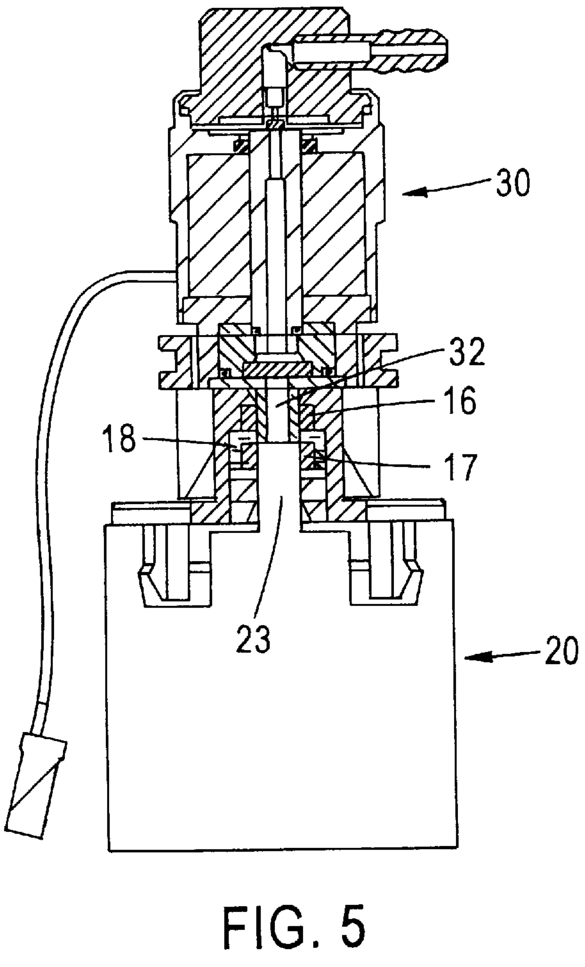
Figure 6:
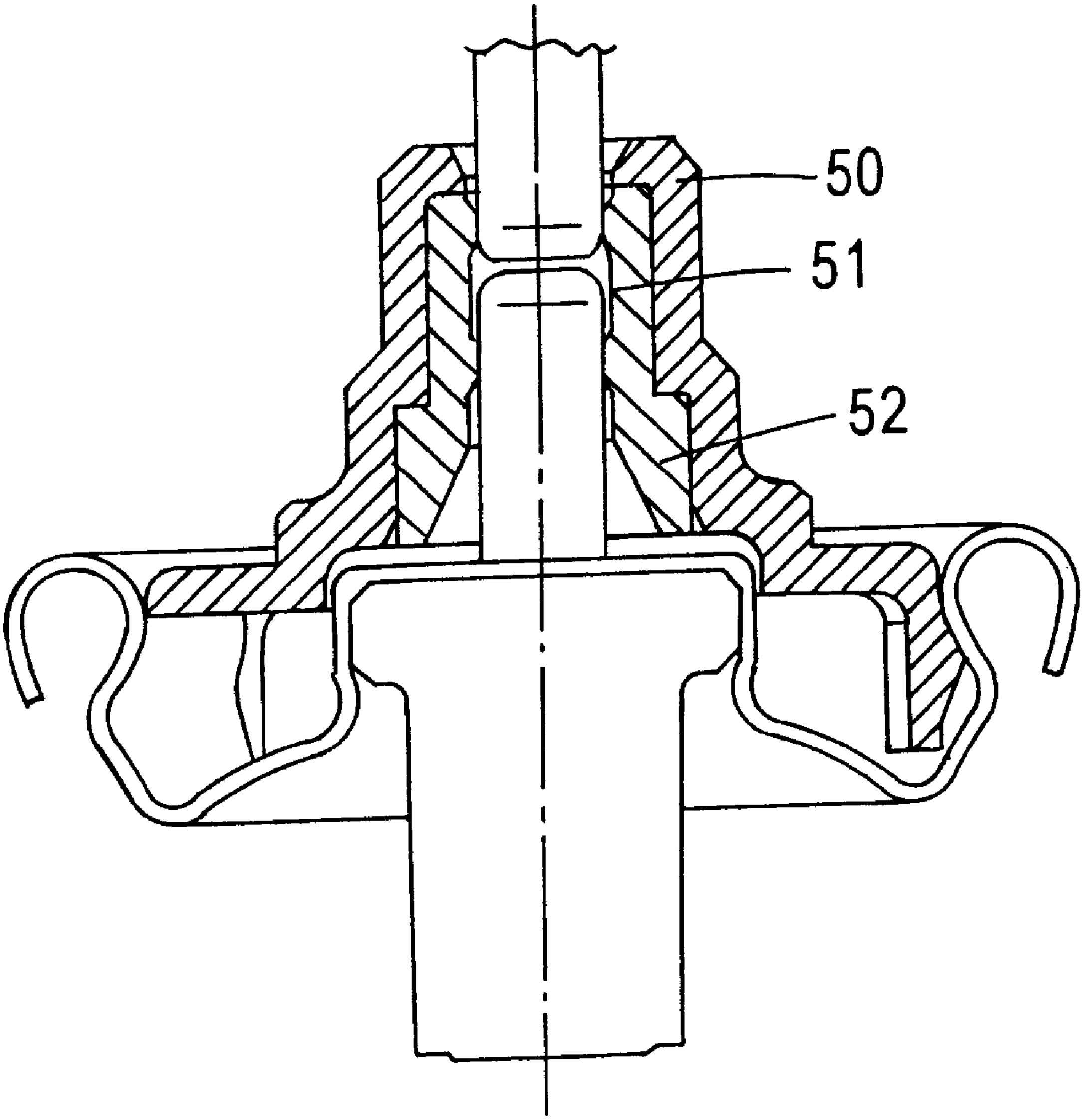

The seal 11, which is in the form of a sleeve, could also be replaced by two O-rings 16, 17, respectively intended to surround the two male joining pieces 32, 23 and thus to extend right across the seal plane of the two joining pieces 32, 23. In this case a piece 18 forming a spacer is interposed between the two seals in such a way as to position them correctly as shown in FIG. 5.

In another embodiment of the connection 50, the seal 51, in the form of a sleeve, and the retention ring 52 are formed in a single piece.

Provision could also be made to fix the connection and the fuel cartridge firmly together.

What is claimed is:

1. A connector between a male cylindrical outlet of a cartridge of compressed gas and a male cylindrical inlet of a gas receiver for a valve on a combustion tool, said connector comprising a rigid housing including a cylindrical seal support having two open ends for receiving the male cylindrical outlet of the gas cartridge and the male cylindrical inlet of the gas receiver, respectively, a laterally extending abutment base extending outwardly from the cylindrical support and having support surfaces for abutting the gas cartridge, and a seal arrangement disposed within the cylindrical support for contacting and sealing said male cartridge outlet and said male gas receiver inlet, further comprising attachment legs depending from the abutment base for attachment of the connector to the gas cartridge.

2. The connector of claim 1, wherein the seal arrangement is a sleeve arranged to surround said male outlet and inlet ends.

3. The connector of claim 1, wherein the seal arrangement comprises two o-rings intended to surround the two male outlet and inlet ends.

4. The connector of claim 1, wherein the cylindrical support is arranged to guide the two male inlet and outlet ends so that they abut each other.

5. The connector of claim 1, wherein the attachment legs are adapted to be clipped to the border of a gas cylinder.

6. The connector of claim 1, wherein the interior of the cylindrical portion has a sealing ring and a retainer ring.

7. The connector of claim 1, wherein the sealing ring and the retaining ring are a single piece.

8. A connector between a male cylindrical outlet of a cartridge of compressed gas and a male cylindrical inlet of a gas receiver for a valve on a combustion tool, said connector comprising a rigid housing including a cylindrical seal support having two open ends for receiving the male cylindrical outlet of the gas cartridge and the male cylindrical inlet of the gas receiver, respectively, a laterally extending abutment base extending outwardly from the cylindrical support and having support surfaces for abutting the gas cartridge, and a seal arrangement disposed within the cylindrical support for contacting and sealing said male cartridge outlet and said male gas receiver inlet, wherein the seal arrangement is a sleeve arranged to surround said male outlet and inlet ends, wherein the seal arrangement comprises an inner groove for retaining leaked gas.

9. A connector between a male cylindrical outlet of a cartridge of compressed gas and a male cylindrical inlet of a gas receiver for a valve on a combustion tool, said connector comprising a rigid housing including a cylindrical seal support having two open ends for receiving the male cylindrical outlet of the gas cartridge and the male cylindrical inlet of the gas receiver, respectively, a laterally extending abutment base extending outwardly from the cylindrical support and having support surfaces for abutting the gas cartridge, and a seal arrangement disposed within the cylindrical support for contacting and sealing said male cylindrical outlet and said male gas receiver inlet, wherein said male cylindrical outlet and said male gas receiver inlet each include an insertion end that has a constant diameter outer surface structured to be inserted axially into an associated one of said open ends of the cylindrical seal support along a longitudinal axis of the seal support said seal arrangement is arranged to enable the male cylindrical outlet of the gas cartridge and the male cylindrical inlet of the gas receiver to be slid axially into and out of the connector.

10. The connector of claim 9, wherein each said insertion end has a constant diameter outer surface along an entire extent of said insertion end disposed within the cylindrical seal support.

11. A connector between a male outlet of a cartridge of compressed gas and a male inlet of a gas receiver for a valve on a combustion tool, said connector comprising a rigid housing including a seal support having two open ends for receiving the male outlet of the gas cartridge and the male inlet of the gas receiver, respectively, a laterally extending abutment base extending outwardly from the support and having support surfaces for abutting the gas cartridge, and a seal arrangement disposed within the support for contacting and sealing said male outlet and said male gas receiver inlet, said male outlet and said male gas receiver inlet each include an insertion end that has a dimension that is not greater than a corresponding dimension of portions of said insertion ends located progressively further from a forwardmost end of said insertion end to enable said male inlet and outlet to be inserted axially into an associated one of said open ends of the seal support along a longitudinal axis of the seal support.

* * * * *